(12) United States Patent
Ficker et al.

(10) Patent No.: US 11,466,403 B2
(45) Date of Patent: Oct. 11, 2022

(54) LOOP STRUCTURE, METHOD FOR PRODUCING A LOOP STRUCTURE AND ELEMENT

(71) Applicant: FREISTAAT BAYERN VERTRETEN DURCH HOCHSCHULE HOF, INSTITUT FÜR MATERIAL WISSENSCHAFTEN, Hof (DE)

(72) Inventors: Frank Ficker, Tiefenbrunn (DE); Nathalie Kuegel, Delmenhorst (DE); Alexandra Luft, Hof (DE); Roxana Miksch, Altenstadt (DE); Daniela Schoen, Hof (DE)

(73) Assignee: FREISTAAT BAYERN VERTRETEN DURCH HOCHSCHULE HOF, INSTITUT FÜR MATERIAL WISSENSCHAFTEN, Hof (DE)

( * ) Notice: Subject to any disclaimer, the term of this patent is extended or adjusted under 35 U.S.C. 154(b) by 542 days.

(21) Appl. No.: 16/487,643

(22) PCT Filed: Feb. 19, 2018

(86) PCT No.: PCT/EP2018/054028
§ 371 (c)(1),
(2) Date: Aug. 21, 2019

(87) PCT Pub. No.: WO2018/153813
PCT Pub. Date: Aug. 30, 2018

(65) Prior Publication Data
US 2019/0382956 A1    Dec. 19, 2019

(30) Foreign Application Priority Data
Feb. 21, 2017 (DE) .................... 10 2017 103 561.3

(51) Int. Cl.
*D07B 5/00* (2006.01)
*D03D 1/00* (2006.01)
(Continued)

(52) U.S. Cl.
CPC ............... *D07B 5/005* (2013.01); *D03D 1/00* (2013.01); *D03D 11/02* (2013.01); *D04C 1/06* (2013.01);
(Continued)

(58) Field of Classification Search
CPC .. D04C 1/06; D07B 5/005; D07B 2201/1004; D03D 1/00; D03D 11/02
See application file for complete search history.

(56) References Cited

U.S. PATENT DOCUMENTS

| 487,149 A | * | 11/1892 | Krouse et al. | D03D 3/005 2/338 |
| 936,492 A | * | 10/1909 | Thun et al. | D04C 1/06 87/9 |

(Continued)

FOREIGN PATENT DOCUMENTS

| DE | 10 2015 008 904 A1 | 2/2017 |
| EP | 2 594 428 A2 | 5/2013 |

(Continued)

OTHER PUBLICATIONS

German Patent Office Search Report, dated Sep. 22, 2017.
PCT Search Report, dated Jun. 12, 2018.
Japanese Office Action with translation, dated Dec. 21, 2021.

*Primary Examiner* — Shaun R Hurley
(74) *Attorney, Agent, or Firm* — Dority & Manning, P.A.

(57) ABSTRACT

A loop structure includes a first element having a first loop, and a second element having a second loop, the first loop interlocking with the second loop. Each of the first and second elements include a plurality of strands, wherein at least a portion of the strands are formed from a flexible (Continued)

material. The strands of the first and second elements are processed in a textile-like manner into one of a braided, woven, knitted, or enmeshed structure defining at least two webs spaced-apart along a longitudinal direction of the first and second elements. The strands are divided into longitudinally extending sections between the webs, the sections forming wings that connect the webs. In the first element, the wings form the first loop, and in the second element, the wings form the second loop.

15 Claims, 8 Drawing Sheets

(51) Int. Cl.
 *D03D 11/02* (2006.01)
 *D04C 1/06* (2006.01)
 *F16G 13/18* (2006.01)
 *B60P 7/08* (2006.01)
 *B66C 1/12* (2006.01)
 *E04H 17/04* (2006.01)

(52) U.S. Cl.
 CPC ............ *F16G 13/18* (2013.01); *B60P 7/0876* (2013.01); *B66C 1/12* (2013.01); *D07B 2201/1004* (2013.01); *E04H 17/04* (2013.01)

(56) References Cited

U.S. PATENT DOCUMENTS

| | | | | | |
|---|---|---|---|---|---|
| 972,718 | A | * | 10/1910 | Rahm | D04C 1/06 87/37 |
| 2,840,983 | A | * | 7/1958 | Keilbach | F16G 13/14 63/11 |
| 2,879,687 | A | * | 3/1959 | Leimbach | D04C 3/06 87/37 |
| 3,866,512 | A | * | 2/1975 | Berger | D04C 3/30 87/8 |
| 4,779,411 | A | * | 10/1988 | Kendall | D07B 7/165 428/7 |
| 5,673,464 | A | * | 10/1997 | Whittaker | A45C 13/30 410/97 |
| 6,128,998 | A | * | 10/2000 | Freitas | D04C 3/00 87/8 |
| 6,907,810 | B2 | * | 6/2005 | Kim | D04C 3/06 87/16 |
| 8,171,714 | B2 | * | 5/2012 | Wienke | F16G 13/12 59/92 |
| 8,347,772 | B2 | * | 1/2013 | Dow | D04C 3/18 87/41 |
| 8,418,434 | B1 | * | 4/2013 | Carruth | A44C 15/005 D11/12 |
| 8,689,534 | B1 | | 4/2014 | Chou | |
| 9,261,167 | B2 | * | 2/2016 | Chou | F16G 13/14 |
| 2014/0165345 | A1 | * | 6/2014 | Schultz | A43C 9/02 24/712 |
| 2020/0056312 | A1 | * | 2/2020 | Kiefer | D04C 3/48 |

FOREIGN PATENT DOCUMENTS

| | | |
|---|---|---|
| JP | S57 46583 | 3/1982 |
| JP | 2009 001360 A | 1/2009 |
| JP | 2014-111851 A | 6/2014 |
| WO | WO 00/17085 | 3/2000 |

* cited by examiner

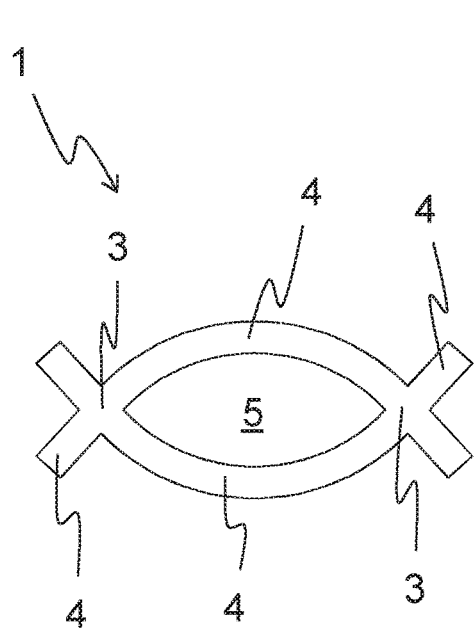
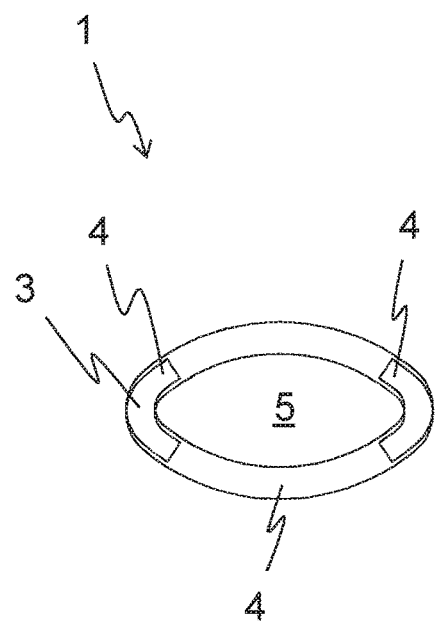
Fig. 3a  Fig. 3b
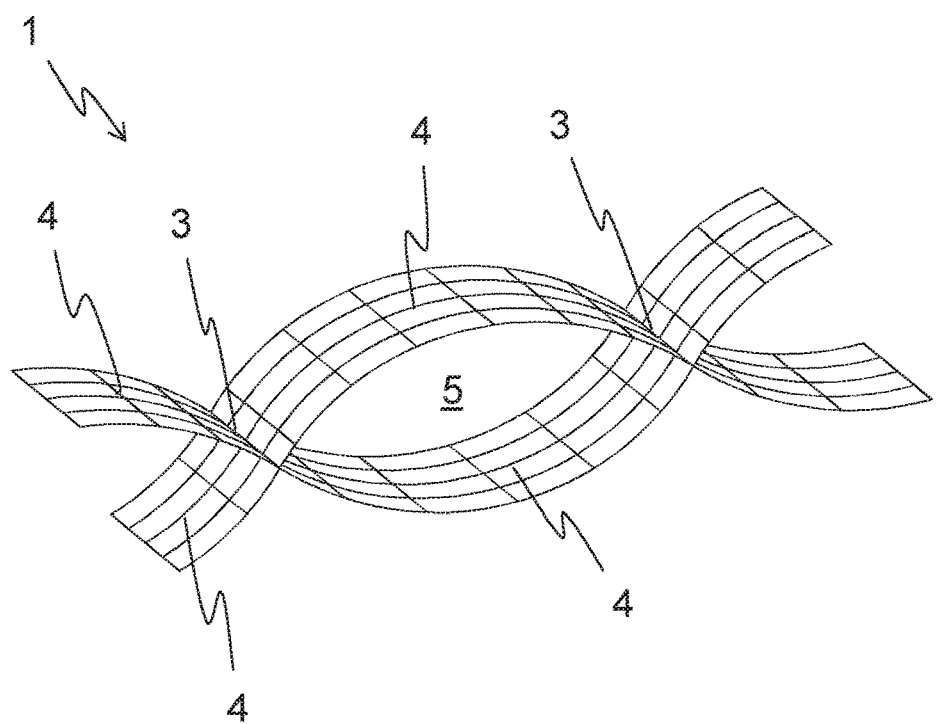
Fig. 4

LOOP STRUCTURE, METHOD FOR PRODUCING A LOOP STRUCTURE AND ELEMENT

FIELD OF THE INVENTION

This invention relates to a loop structure comprising at least two elements, wherein each element comprises at least one loop that interlocks with at least one loop of an additional element, a method for producing such a loop structure and an element.

BACKGROUND

The form of loop structures that probably most frequently occur are used is a chain. Chains with links made of metals, such as iron, have been known for several thousand years. They are used for a wide variety of purposes, such as lifting or pulling loads, lashing cargo, but also in an unloaded state, for example for cordoning off or decoration.

A disadvantage of chains with links made of metal is or can be that they have a high weight, are hard and can damage other objects, are susceptible to corrosion and are electrically conductive.

Textile link chains, which can also absorb high tensile forces, do not have such disadvantages. Such a textile link chain is disclosed, for example, in WO 00/17085. There, the individual loops consist of a flexible material with two ends, wherein the ends overlap each other and are sewn together.

However, a disadvantage of this solution is that each of the loops has to be sewn individually, which signifies a very high production effort.

SUMMARY OF THE INVENTION

As such, an object of this invention is to create a loop structure that can be produced with less production effort. Additional objects and advantages of the invention will be set forth in part in the following description, or may be obvious from the description, or may be learned through practice of the invention.

The objects are achieved by a loop structure and a method for producing a loop structure with the characteristics described and claimed herein.

A loop structure with at least two elements is proposed. Each element has at least one loop that interlocks with at least one loop of an additional element. The most simple loop structure thus comprises two elements, each with one loop, wherein the two loops interlock. However, link chains, rope ladders, nets and highly complex loop structures are also conceivable within the scope of the generic term as used herein.

In accordance with the invention, each of the elements has several strands, at least some of which are made of flexible material. Thus, it is also possible that some of the strands are made of an inflexible material. The strands of an element are processed in a textile-like manner into at least two webs that are spaced apart from each other in the longitudinal direction of the element. Textile-like processing is understood in particular as braiding, weaving, knitting and/or enmeshing, but other methods such as crocheting or linking are also conceivable. If the flexible material can be processed in a textile-like manner (thus, in particular, if it can be braided, woven, knitted and/or enmeshed), it can also be used for loop structures. The material that is actually used depends on the requirements of the loop structure. The strands of an element are processed in a textile-like manner into webs that are spaced apart from each other. To a large extent, the length of the webs can be freely selected depending on the application. They can even be so short that a web is essentially just a single crossover of some or more of the strands. The textile-like working pattern, in particular braided, weaved, knitted and/or enmeshed patterns, can also be chosen freely to a large extent. Depending on the application, flat or round textile-like working patterns, for example, can be advantageous. It is also possible that some of the strands (for example, in the core) run along without being processed in a textile-like manner—that is, they are essentially straight.

The strands are divided into sections and each part is processed into a textile-like wing. The division into two parts is the most simple division and usually sufficient, but a division into more than two parts is also conceivable. Furthermore, the parts do not have to be the same size, which is likely to be the case in most applications. Each part of the strands is processed in a textile-like manner into a wing. Thereby, two webs are connected to each other by at least two wings. Thus, in one element, there is at least one sequence of web-wing-web. Thereby, the strands processed in a textile-like manner in the web split up in the wings and come together once again in the next web. Thereby, the wings form the loops of the elements.

The loop structure in accordance with the invention can, for example, be braided on a braiding machine or woven on a weaving machine, by which it can be produced with little production effort.

Advantageously, the strands are connected to each other at the ends of the elements. In this manner, they can be protected against unintentional opening or unbraiding. Depending on the flexible material, it can be used to glue, weld, knot, splice, sew and/or fuse the ends.

It is also advantageous if the wings are worked into a tube in a textile-like manner. Preferably, the webs and/or wings located at the ends of the elements are then inverted into one or more wings. This makes the elements more compact at their ends, since it is no longer the case that webs or wings are protruding. In addition, the additional friction of the inverted web or wing on the inside of the wing increases the tensile strength of the element.

The transition from the web to the wings (and back again in reverse) can be carried out in such a manner that, up to a transition point, all strands to the web are processed in a textile-like manner and, from such transition point, one half of the strands are processed in a textile-like manner into one wing or a fraction of the strands are processed in a textile-like manner into several wings. Then, however, a hole appears at the transition point between the wings, which also reduces the tensile strength. It is therefore advantageous if a transition zone is provided between adjacent webs and wings, which transition zone is different from a textile-like working pattern of the webs, but in which strands of the wings cross and/or connect with each other. The additional crossovers and/or connections close the hole, which also increases the tensile strength of the element.

Depending on the purpose of application of the loop structure, it is advantageous if the strands contain natural fibers, synthetic fibers, glass fibers, carbon fibers, metal fibers, plastic wires and/or metal wires. Thereby, various properties, such as desired tensile strength, density, resistance to environmental influences or electrical conductivity, are interesting. It is also possible to process different strands in a textile-like manner.

In an advantageous additional form, the loop structure is a link chain. Thereby, each element has exactly two webs and at least two wings. Thereby, two of the wings connect the webs and form a loop. With the exception of the loops of the first and last element of the link chain, all loops interlock with two additional loops each, as is usual for a link chain. Thereby, a link chain can be produced with little production effort and in almost any length, and at the same time can be used for many purposes, for example as a replacement for other link chains.

The loop structure is formed according to the previous description, wherein the specified features may be present individually or in any combination.

Furthermore, a method for the production of a loop structure as described above is proposed. In accordance with the invention, at least two original elements are worked from several strands, at least partly of flexible material, in a textile manner. Thereby, textile-like processing is understood in particular as braiding, weaving, knitting and/or enmeshing, but other methods such as crocheting or linking are also conceivable. The original elements alternately have one web, at least two wings and once again one web, wherein this sequence can be repeated as often as desired. In the web, the strands assigned to the original element are processed in a textile-like manner, wherein the textile-like working pattern can be freely selected to a large extent. Depending on the application, flat or round textile-like working patterns, for example, can be advantageous. To a large extent, the length of the web can also be freely selected, depending on the application. The web can even be so short that it is essentially just a single crossover of some or more of the strands. Furthermore, it is possible that some of the strands (for example, in the core) run along without being processed in a textile-like manner—that is, they are essentially straight.

The strands are divided into sections, wherein each wing comprises a part of the strands. In the wings as well, the part of the strands is processed in a textile-like manner according to a working pattern that is largely freely selectable in a textile-like manner, wherein, here as well, some of the strands, for example in the core, can run along without being processed in a textile-like manner. Thereby, the wings form loops, and loops of the different original elements interlock with each other. Work in a textile-like manner can be automated and operated with relatively little production effort.

Advantageously, some or all of the webs and/or wings of the original elements are severed in order to obtain individual elements of the loop structure. Severing can be carried out in particular by cutting and/or melting, such as hot cutting. Which webs or wings are severed depends on the desired loop structure. However, there may also be original elements with which neither webs nor wings are severed.

It is also advantageous if the original elements are stretched after the textile-like work and prior to severing, by which the severing can be carried out more precisely.

It is also advantageous if the strands are connected to each other at the ends of the elements. In this manner, they are protected against unintentional opening or unbraiding. Depending on the flexible material, it can be used to glue, weld, knot, splice, sew and/or fuse the ends.

Advantageously, the wings are worked in a textile-like manner into a tube and preferably, after severing the webs and connecting the strands, the webs and/or wings located at the ends of the elements are inverted into one or more wings. This makes the elements more compact at their ends, since it is no longer the case that webs or wings are protruding. In addition, the additional friction of the inverted web or wing on the inside of the wing increases the tensile strength of the element.

It is also advantageous if a textile-like transition zone is worked in a textile-like manner between the webs and wings, which transition zone is different from a textile-like working pattern of the webs, but in which strands of the wings cross and/or connect with each other. This avoids a hole between the wings, which may arise if such transition zone is missing. Without this hole, the tensile strength of the element is increased.

Depending on the purpose of application of the loop structure, it is advantageous if the strands contain natural fibers, synthetic fibers, glass fibers, carbon fibers, metal fibers, plastic wires and/or metal wires. Thereby, various properties, such as desired tensile strength, density, resistance to environmental influences or electrical conductivity, are interesting.

In an advantageous additional form of the invention, exactly two original elements are worked in a textile-like manner, wherein at least some of the loops of the original elements interlock alternately. The original elements are each separated between two of the loops that interlock with each other, such that a link chain arises. Thus, a highly versatile link chain is produced with little production effort.

Finally, it is advantageous if the textile-like work is carried out with a machine producing narrow textiles. It is thus carried out in particular with a variation braider, a 3D braider, a ribbon loom, a warp knitting machine and/or a knitting machine. For example, a variation braider can move the clappers in many different ways and can be programmed in such a manner that the original elements are braided automatically with interlocking loops. Thereby, the size of the variation braid must be adapted to the complexity of the loop structure to be braided.

The method for producing the loop structure is carried out in accordance with the preceding description, wherein the specified features are capable of being carried out individually or in any combination.

An element in accordance with the invention consists of a loop and several strands, at least some of which are produced from flexible material. The strands of the element are processed in a textile-like manner into at least two webs that are spaced apart from each other in the longitudinal direction of the element; in particular, they are braided, woven, knitted and/or enmeshed. The strands are also divided into sections and each part is processed in a textile-like manner into a wing, wherein at least two wings connect two of the webs to each other and the loop is formed from the wings. The element in accordance with the invention can be used, for example, as a ring, which can be used in many different ways.

The strands are preferably connected to each other at the ends of the elements; in particular, they are glued, welded, knotted, spliced, sewn and/or fused. The ends are thus protected, and this advantageously prevents the textile connection of the strands from being dissolved when the element is used.

The wings are preferably worked in a textile-like manner into a tube, and the webs and/or wings located at the ends of the element are preferably inverted into one or more wings. This results in the appearance of a closed ring that is protected from damage at the ends of the strands.

A transition zone is advantageously provided between adjacent webs and wings, which transition zone is different from a textile-like working pattern, in particular a braided pattern, a woven pattern, a knitted pattern and/or an enmeshed pattern, of the webs, but in which strands of the wings cross and/or connect with each other. This prevents a hole from forming between the wings. This makes the ring even more stable.

The strands preferably contain natural fibers, synthetic fibers, glass fibers, carbon fibers, metal fibers, plastic wires and/or metal wires. This allows the intended use of the element to be particularly well understood.

BRIEF DESCRIPTION OF THE DRAWINGS

Further advantages of the invention are described in the following embodiments. The following is shown.

DETAILED DESCRIPTION

Figure 1:
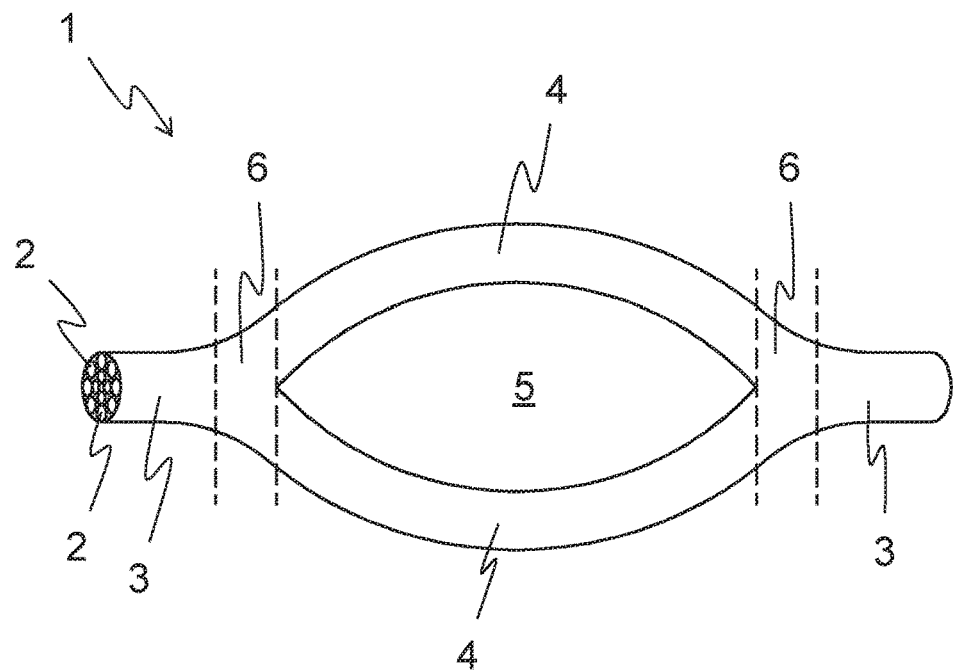
FIG. 1 a schematic view of an element of a loop structure.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic view of an element 1 of a loop structure. Thereby, the strands 2, from which element 1 is braided, are indicated at one end of the element 1. The element 1 may also be woven, knitted, enmeshed, crocheted and/or knotted. For the sake of clarity, only two of the strings 2 were provided with a reference sign. Preferably, such strands 2 are connected to each other at the ends of the element 1, such that the ends are not opened or do not become unbraided.

The element 1 has two webs 3 that are spaced apart from each other in the longitudinal direction of the element 1. All strands 2 of the element 1 are braided in the webs 3. Thereby, the dotted lines only show the boundaries of the individual areas of the element 1.

In two wings 4 of the element 1, which connect the two webs 3 with each other, only half of the strands 2 are braided. The wings 4 thereby enclose a loop 5.

In optional transition zones 6, which are arranged between the webs 3 and wings 4, strands 2, which are assigned to the individual wings 4, cross each other. However, the braiding pattern in transition zones 6 differs from the braiding pattern in webs 3. This avoids the occurrence of a hole at the point at which the web merges into the wings.

In the following description of alternative exemplary embodiments, the same reference signs are used for features that, compared to other exemplary embodiments, are identical and/or at least comparable in their design and/or mode of action. To the extent that such are not described once again in detail, their designs and/or modes of action correspond to the designs and modes of action of the characteristics described above.

Figure 2:
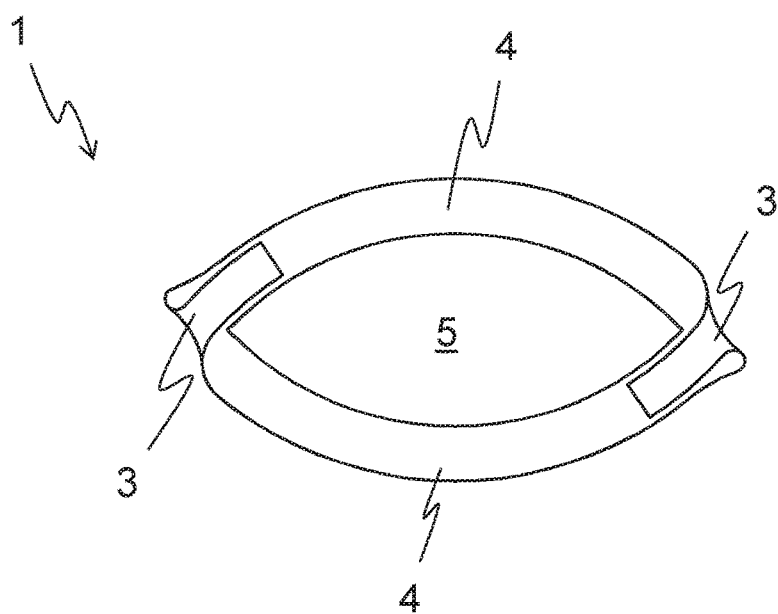
FIG. 2 a schematic view of a section through an additional element of a loop structure, FIG. 3a a schematic view of a section through an additional element of a loop structure, FIG. 3b a schematic view of a section through the element of the loop structure from FIG. 3a, FIG. 4 a schematic view of an additional element of a loop structure, FIG. 5a a schematic view of a section of a loop structure, FIG. 5b an additional schematic view of a section of the loop structure from FIG. 5a, FIG. 6a a schematic view of a section of an additional loop structure, FIG. 6b an additional schematic view of a section of the loop structure from FIG. 6a, FIG. 6c an additional schematic view of a section of the loop structure from FIG. 6a, FIG. 7a a schematic view of a section of an additional loop structure, FIG. 7b an additional schematic view of a section of the loop structure from FIG. 7a, FIG. 7c an additional schematic view of a section of the loop structure from FIG. 7a, FIG. 7d an additional schematic view of a section of the loop structure from FIG. 7a, FIG. 8a a schematic view of a section of an additional loop structure, FIG. 8b an additional schematic view of a section of the loop structure from FIG. 8a, and FIG. 9 a schematic view of an additional loop structure.

FIG. 2 shows a cut through an element 1 with a loop 5. With the element 1 of FIG. 2, the wings 4 were braided in a tube shape. After the strands 2 at the ends of the element 1 had been connected to each other, the webs 3 were each inverted into one wing 4. In FIG. 2, the two webs 3 were inverted into different wings 4, but they can also be inverted into the same wing 4. By inverting the webs 3 into the wing, the element 1 becomes more compact and the additional friction between the web 3 and the inside of the wing 4 also increases the tensile strength of the element 1.

FIG. 2 shows an additional exemplary embodiment of an element 1, with which each of the webs 3 is inverted into two wings 4. This results in a particularly symmetrical element 1.

With the exemplary embodiment of an element 1 shown in FIG. 3a, the webs 3 are braided very short. To a certain extent, they are merely a crossover of the wings 4, which are each located to the left and right of the web 3.

If, at that point, the free wings 4 are inverted into the wings 4, which form the loop 5, the sketch presents the element 1 shown in FIG. 3b.

The element 1 of the exemplary embodiment shown in FIG. 4 is woven. Here as well, the web 3 is only a crossover of the wings 4.

Figure 5A:
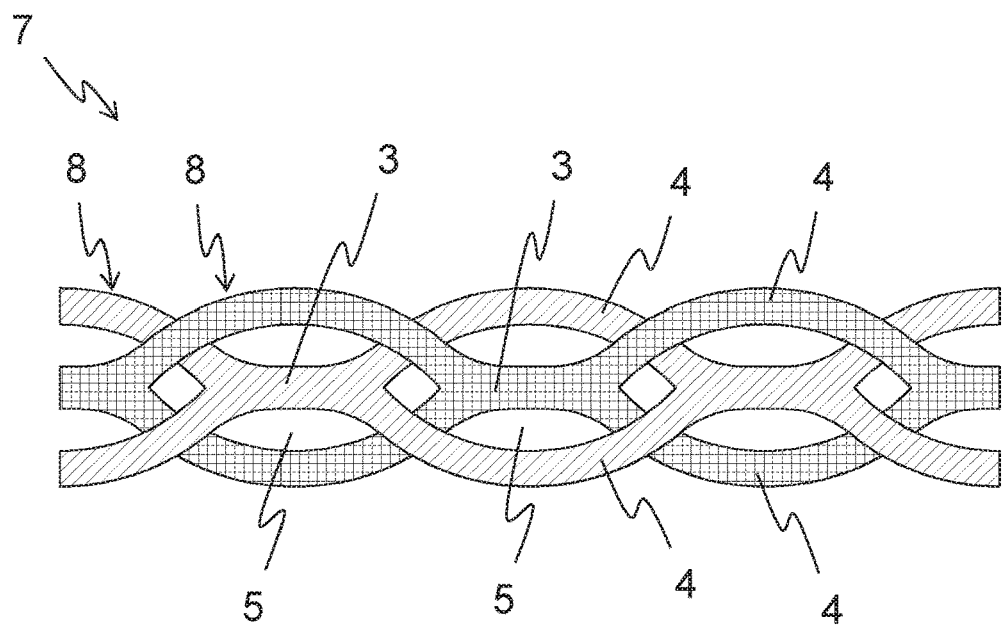

FIG. 5a shows a section of a loop structure 7 with two original elements 8. Thereby, the loop structure 7 can be continued to the left and/or to the right. The hatching of the original element 8 only serves the purpose of better recognizability.

Each of the original elements 8 has a sequence of one web 3, two wings 4, one web 3, two wings 4, etc. In doing so, loops 5 are formed between the wings 4. For the sake of clarity, not all webs 3, wings 4 and loops 5 were provided with reference signs.

The loops 5 of the two original elements 8 are arranged in such a manner that they always interlock alternately. Thus, a loop 5 of one of the original elements 8 always interlocks with two adjacent loops 5 of the other original element 8. Such structure can be easily braided on a variation braider, for example.

Figure 5B:
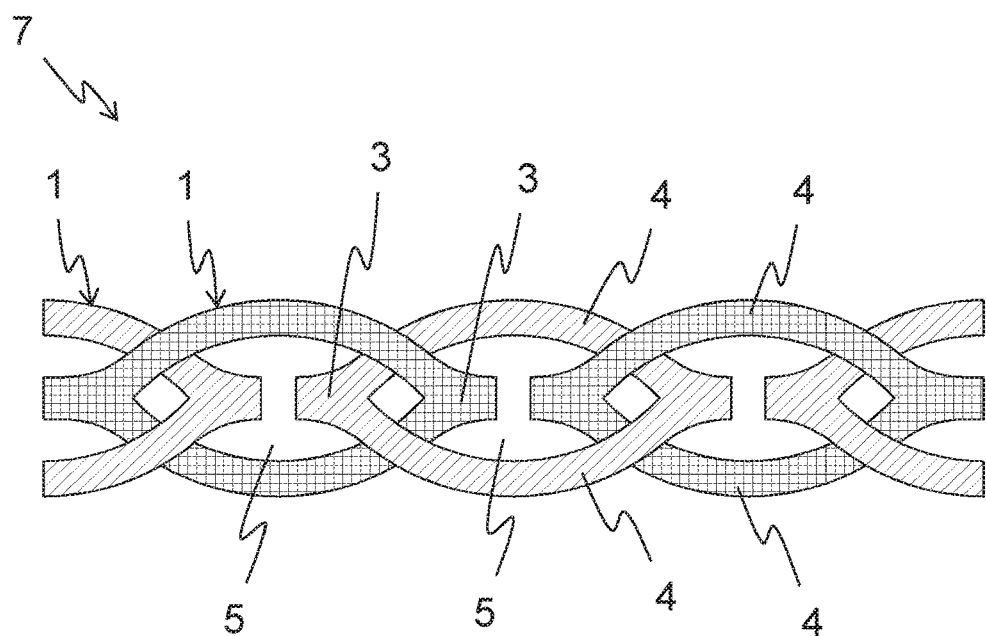

In order to obtain a loop structure 7 formed as a link chain from the original elements 8 of FIG. 5a, the original elements 8 are severed at their webs 3. The result is the loop structure 7 shown in FIG. 5b, which consists of many individual elements 1, whose loops 5 interlock alternately, such that a link chain arises.

After severing the webs 3, the strands can be connected to each other at the ends of the elements 1, and the webs 3 can be inverted into the wings 4.

Figure 6A:
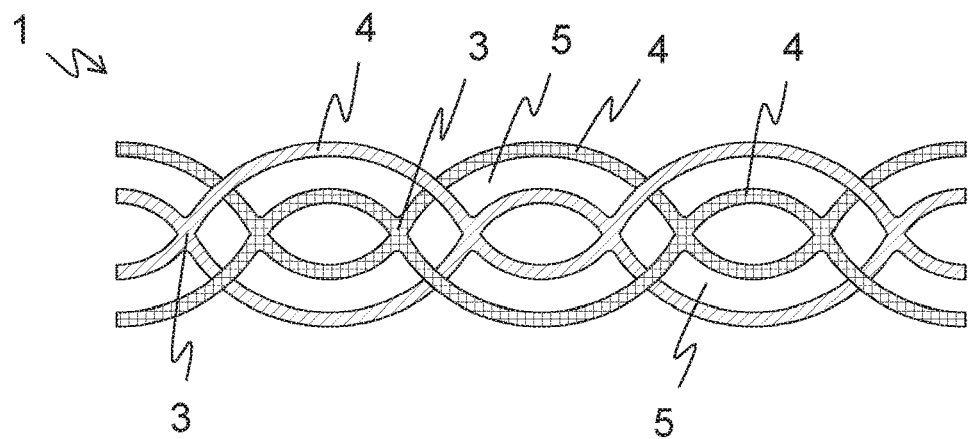

FIG. 6a shows a variant of the exemplary embodiment from FIG. 5a. In contrast to the exemplary embodiment in FIG. 5a, the webs 3 are kept very short and additional wings 4 are provided, which additional wings form loops 5 that do not interlock with other loops 5.

Figure 6B:
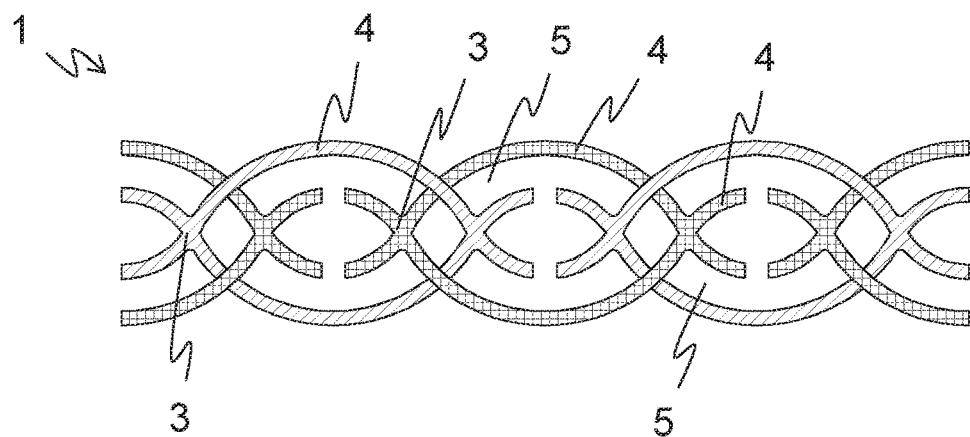

In order to obtain a loop structure 7 formed as a link chain, as shown in FIG. 6b, the wings 4 of the loops 5 are severed, which wings do not interlock with other loops 5.

Figure 6C:
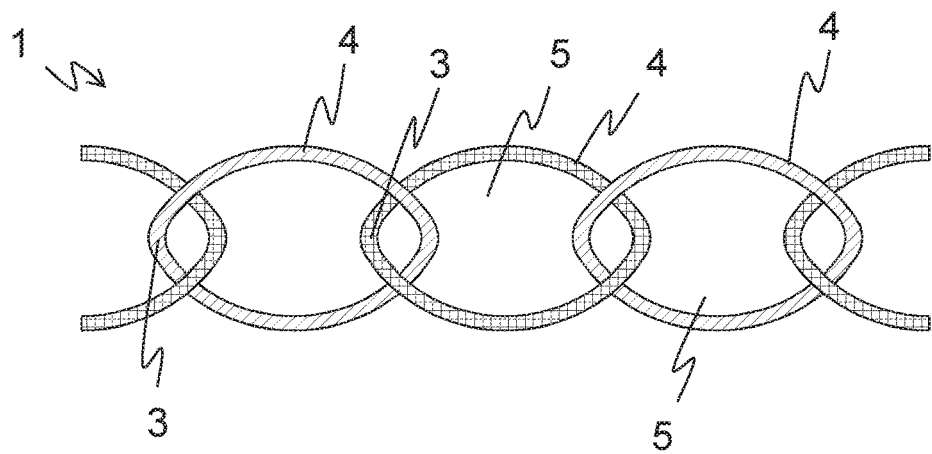

If the free wings 4 are then inverted into the tube-shaped wings 4, the link chain shown in FIG. 6c arises.

Figure 7A:
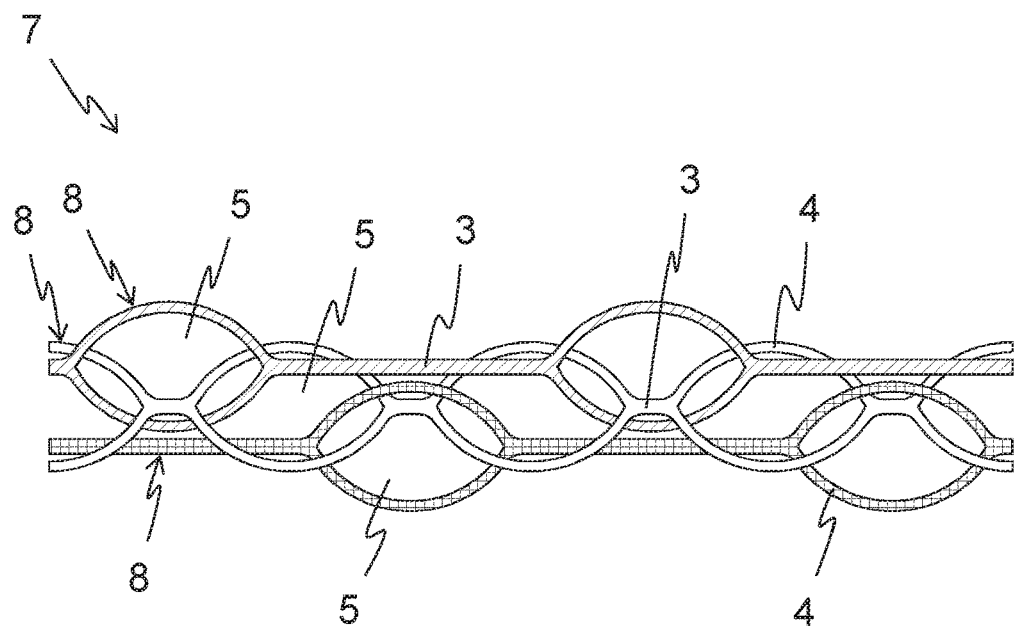

FIG. 7a shows an additional exemplary embodiment of a loop structure 7. Such loop structure 7 has three original elements 8. Thereby, the webs 3 of the original elements 8 shown in FIG. 7a above and below are compared with the webs 3 of the middle original element 8.

Each loop 5 of the middle original element 8 interlocks with one loop 5 each of the upper and lower original element 8, and the loops 5 of the upper and lower original element 8 interlock with two adjacent loops 5 of the middle original element 8.

At that point, the webs 3 of the middle original element 8 are severed. Thereby, the middle original element 8 disaggregates into a multiple number of elements 1.

Figure 7B:
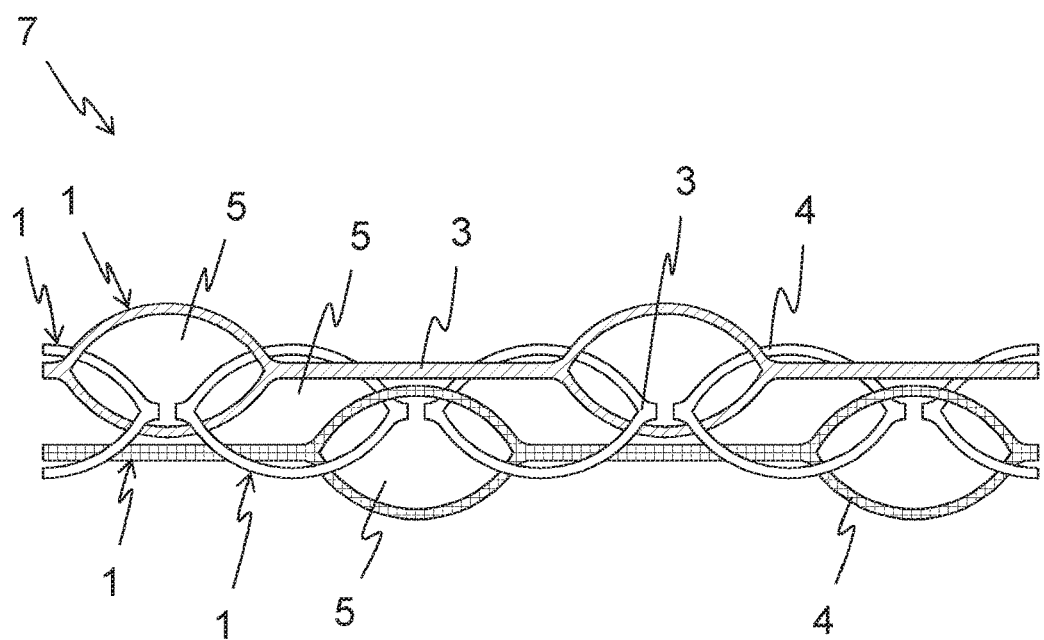

On the other hand, the upper and lower original elements 8 are not severed. This results in the loop structure 7 shown in FIG. 7b. Thereby, the upper and lower elements 1 of the loop structure 7 have a multiple number of loops 5, while each of the middle elements 1 has only one loop 5.

Figure 7C:
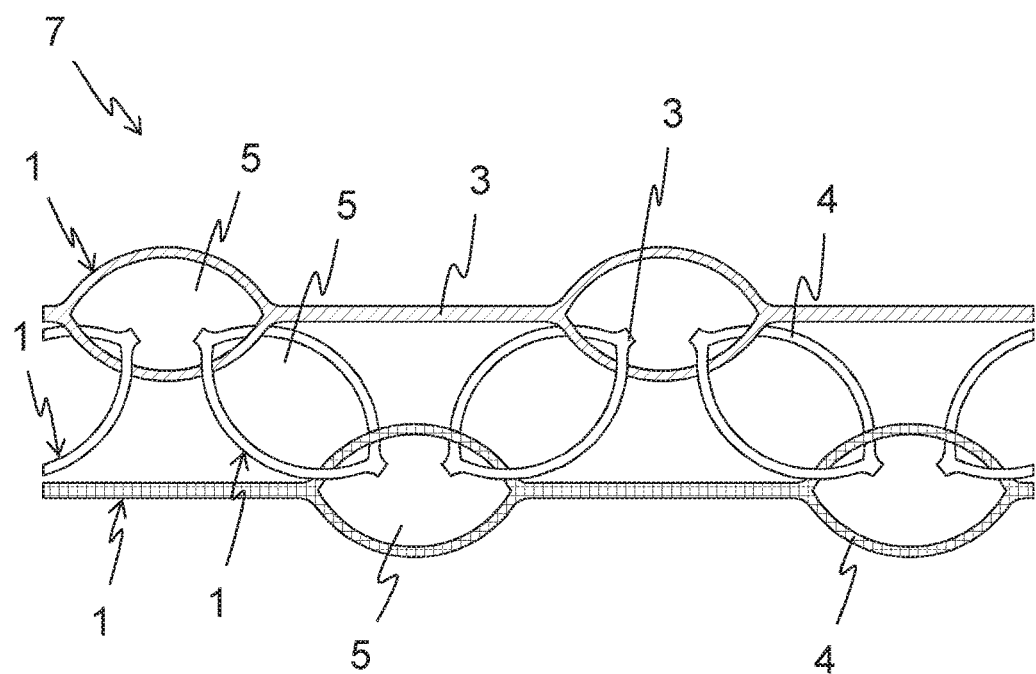

At that point, if, as shown in FIG. 7c, the upper and lower elements 1 are pulled slightly apart, it becomes apparent that the upper and lower elements 1 are connected in a zigzag-shaped manner by a multiple number of middle elements 1.

Figure 7D:
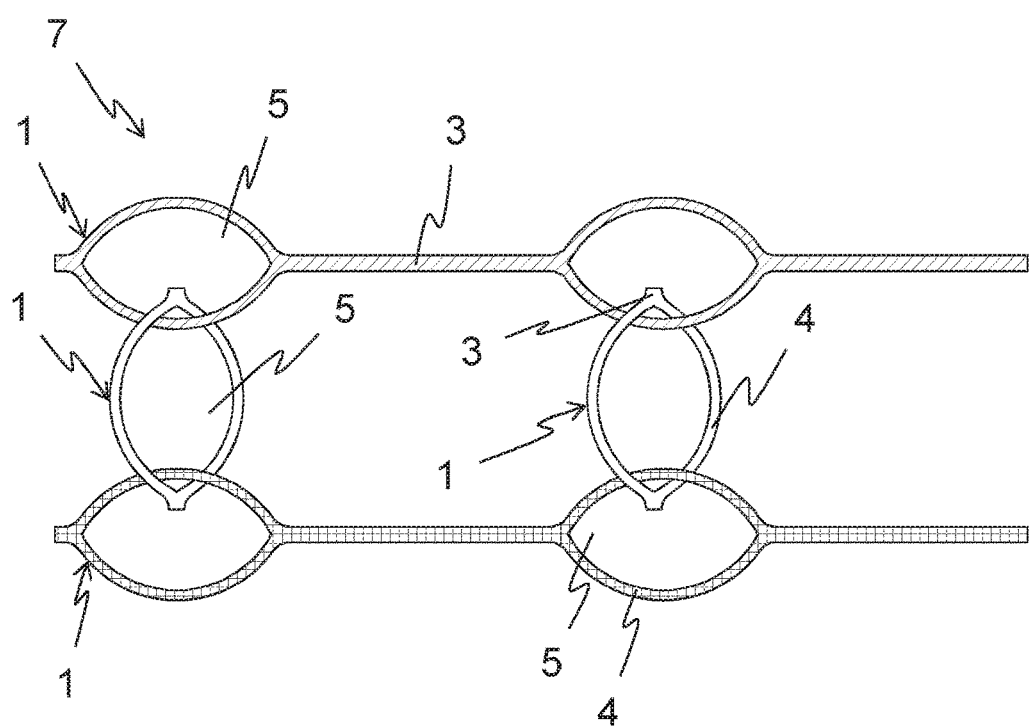

If in addition, as shown in FIG. 7d, every second of the middle element 1 is removed, a loop structure 7 formed as a rope ladder is obtained.

Figure 8A:
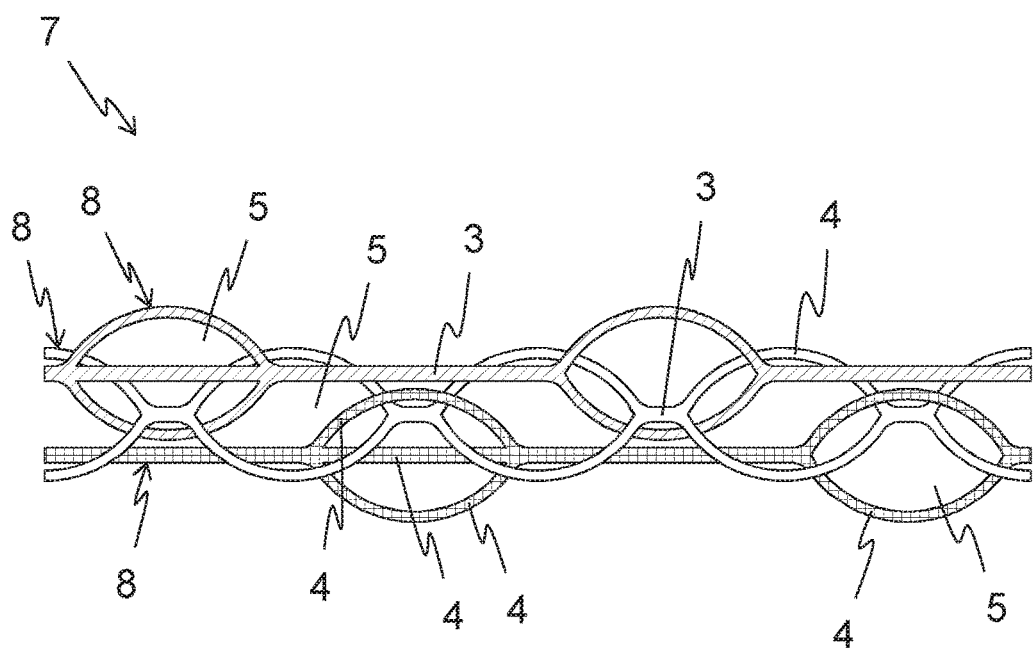

FIG. 8a shows a loop structure 7 with original elements 8, with which the strands 2 are divided into sections into three parts, such that a web 3 divides into three wings 4.

Figure 8B:
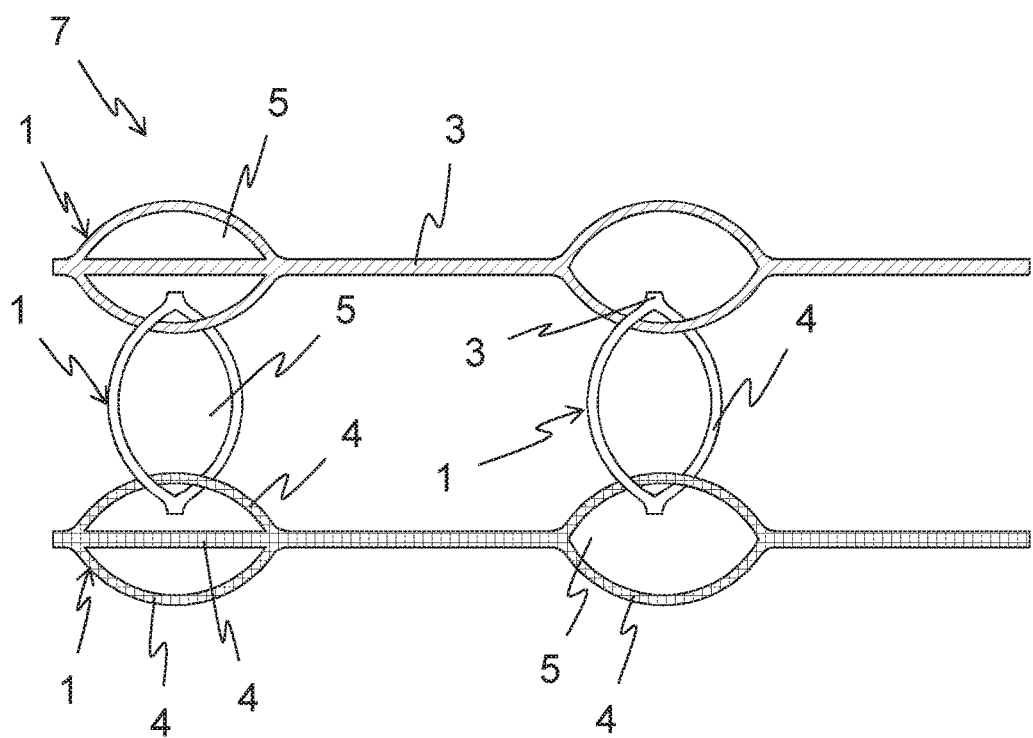

After severing the webs 3 of the middle original element 8 and removing every second of the middle elements 1, the loop structure 7 shown in FIG. 8b—analogous to FIGS. 7a to 7d—is achieved. The extra loops 5 can be used, for example, to connect the loop structure 7 with other components.

Figure 9:
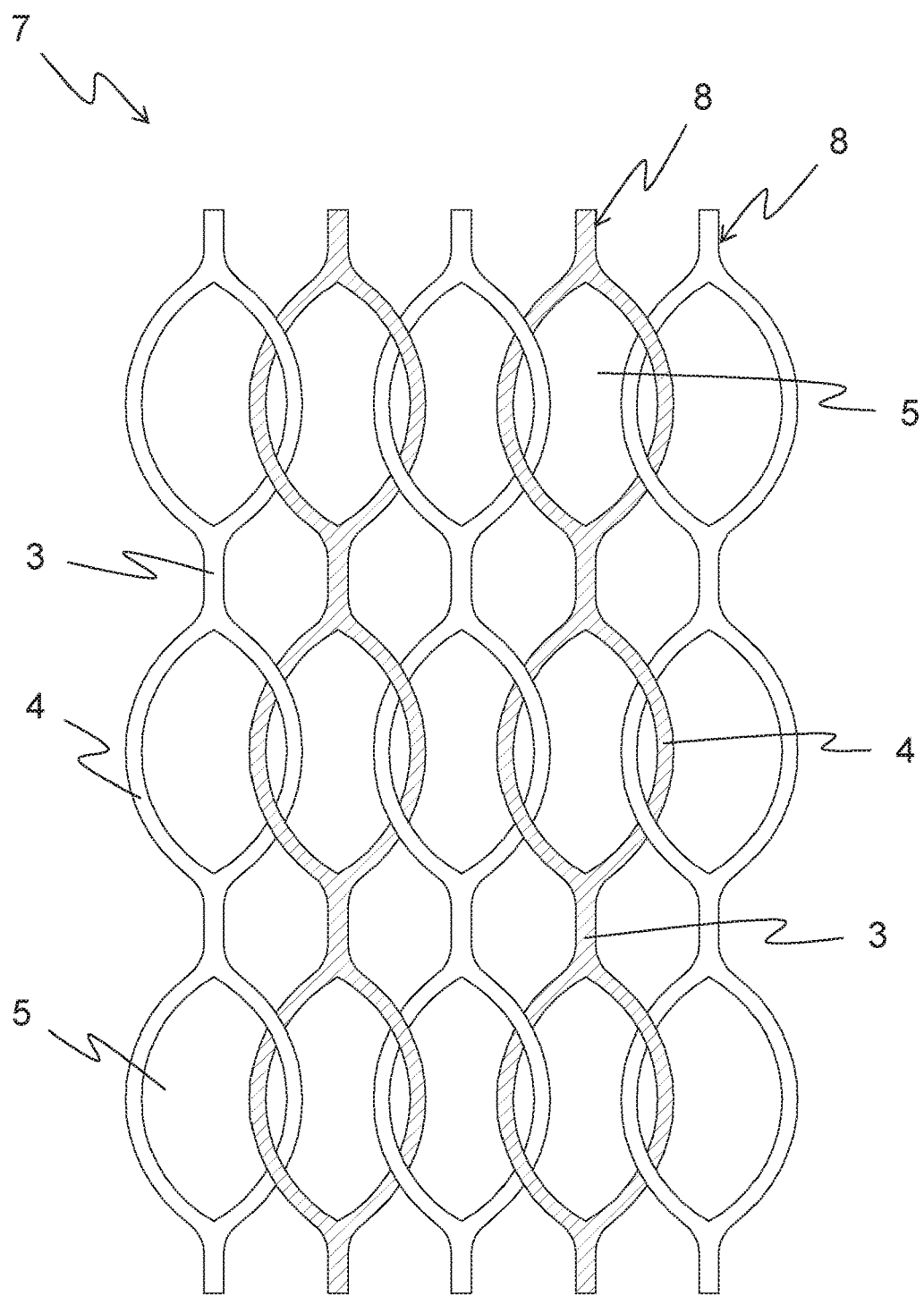

Finally, FIG. 9 shows an additional exemplary embodiment of a loop structure 7. This loop structure has five original elements 8, wherein a generalization to any number of original elements 8 is apparent. It is also obvious that each original element 8 can have more than the three loops 5 shown.

The loops 5 of each adjacent original element 8 interlock with each other, such that a net-like structure is formed. The loop structure 7 is thus a knot-free net that can also be folded up in a manner that is highly space-saving.

In this exemplary embodiment, the webs 3 of the original elements 8 are not severed. However, it is conceivable that some of the webs 3, for example the webs 3 of every second original element 8, are severed. The loop structure 7 thus remains a net, but has different properties in terms of flexibility, stretchability and mesh size compared to a loop structure 7 that is formed as a net, with which the webs 3 are not severed.

This invention is not limited to the illustrated and described embodiments. In particular, a multiple number of loop structures can be produced by the varying interlocking of loops. Additional variations within the scope of the claims, just as the combination of characteristics, are possible, even if they are illustrated and described in different embodiments.

LIST OF REFERENCE SIGNS

1 Element
2 Strand
3 Web
4 Wing
5 Loop
6 Transition zone
7 Loop structure
8 Original element

The invention claimed is:

1. A loop structure, comprising:
a first element comprising a first loop, and a second element comprising a second loop, the first loop interlocking with the second loop;
each of the first and second elements comprising a plurality of strands, wherein at least a portion of the strands are formed from a flexible material;
the strands of the first and second elements processed in a textile-like manner into one of a braided, woven, knitted, or enmeshed structure defining at least two webs spaced-apart along a longitudinal direction of the first and second elements;
the strands divided into longitudinally extending sections between the webs, the sections forming wings that connect the webs; and
in the first element, the wings forming the first loop, and in the second element, the wings forming the second loop.

2. The loop structure according to claim 1, wherein the strands are connected together at ends of the first and second elements by being glued, welded, knotted, spliced, sewn, or fused.

3. The loop structure according to claim 1, wherein the wings are formed into a tube.

4. The loop structure according to claim 1, further comprising a transition zone between the wings and each of the webs, the strands in the transition zone crossing or connected to each other in a manner different from the textile-like manner of the webs.

5. The loop structure according to claim 1, wherein the strands comprise one or a combination of natural fibers, synthetic fibers, glass fibers, carbon fibers, metal fibers, plastic wires, or metal wires.

6. The loop structure according to claim 1, wherein the loop structure is a link chain and each of the first and second elements consists of two webs and at least two wings.

7. A method for producing a loop structure that includes a first element comprising a plurality of first loops, and a second element comprising a plurality of second loops, the first loops interlocking with the second loops, the method comprising:
forming the first and second elements from a plurality of strands, wherein at least a portion of the strands are formed from a flexible material, by processing the strands in a textile-like manner into one of a braided, woven, knitted, or enmeshed structure;
in each of the first and second elements, forming webs spaced-apart along a longitudinal direction of the first and second elements;

between the webs, dividing the strands into longitudinally extending sections and forming the sections into wings that connect the webs, the wings of the first element forming the first loops and the wings of the second element forming the second loops; and interlocking in the first loop and the second loop.

8. The method according to claim 7, further comprising severing the webs in at least one of the first or second elements to obtain individual elements in the loop structure.

9. The method according to claim 8, wherein the first and second elements are stretched after the textile-like processing and prior to the severing.

10. The method according to claim 7, comprising connecting the strands together at ends of the first and second elements by gluing, welding, knotting, splicing, sewing, or fusing.

11. The method according to claim 7, comprising working the wings into a tube.

12. The method according to claim 7, comprising forming a transition zone between the wings and each of the webs, and crossing or connecting the strands in the transition zone to each other in a manner different from the textile-like manner of the webs.

13. The method according to claim 7, wherein the strands comprise one or a combination of natural fibers, synthetic fibers, glass fibers, carbon fibers, metal fibers, plastic wires, or metal wires.

14. The method according to claim 7, comprising forming the loop structure into a link chain by separating the webs in the first and second elements.

15. The method according to claim 7, wherein the processing in a textile-like manner is carried out with one of a variation braider, a 3D braider, a ribbon loom, a warp knitting machine, or a knitting machine producing narrow textiles.

* * * * *